(12) United States Patent
Jones et al.

(10) Patent No.: US 7,759,575 B2
(45) Date of Patent: Jul. 20, 2010

(54) EXPANDABLE POWER DISTRIBUTION UNIT

(75) Inventors: Sarah Jean Jones, Kernersville, NC (US); Clifford Franklin Lincoln, III, Atlanta, GA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/143,335

(22) Filed: Jun. 20, 2008

(65) Prior Publication Data

US 2009/0314541 A1 Dec. 24, 2009

(51) Int. Cl.
*H01J 5/00* (2006.01)
(52) U.S. Cl. .................. 174/50; 174/59; 174/559; 439/207; 220/4.02
(58) Field of Classification Search ............ 174/50, 174/59, 559; 220/4.02; 439/207–211, 215, 439/216
See application file for complete search history.

(56) References Cited

U.S. PATENT DOCUMENTS

| 3,917,101 | A | * | 11/1975 | Ware ......................... 220/3.2 |
| 4,579,403 | A | | 4/1986 | Byrne |
| 5,073,120 | A | | 12/1991 | Lincoln et al. |
| 5,171,159 | A | | 12/1992 | Byrne |
| 5,277,609 | A | * | 1/1994 | Ondrejka ................... 439/215 |
| 5,717,164 | A | * | 2/1998 | Shetterly ..................... 174/58 |
| 5,941,720 | A | * | 8/1999 | Byrne ........................ 439/215 |
| 6,036,517 | A | | 3/2000 | Byrne |
| 6,066,803 | A | * | 5/2000 | Hagarty ...................... 174/50 |
| 6,216,746 | B1 | | 4/2001 | Guebre-Tsadik et al. |
| 6,663,435 | B2 | | 12/2003 | Lincoln, III et al. |

OTHER PUBLICATIONS

Information regarding Powerflex Xcel™ Catalog, Modular System Components for Plug n' Play Configuration, downloaded from website http://www.cablefloor.com/pages/catalog_11-06.html on May 21, 2008, (7) pages.
Information regarding Powerflex Xcel™ Modular Electrical Systems, Product Information Update, Introducing Powerflex Xcel™ Advanced Modular Electrical Power System, downloaded from website http://www.cablefloor.com/pages/powerflex_11-06.html, (3) pages, May 21, 2008.
Information regarding Lay-In NEMA Type 1 Galvanized Wireway, Hoffman Product Catalog, downloaded from website http://www.hoffmanonline.com/product_catalog/product_detail.aspx?cat_1=34&cat_2=23588cat_3=2359&catid=2355&itemid=39982& view=overview on Jun. 20, 2008, (2) pages.

* cited by examiner

*Primary Examiner*—Dhiru R Patel (57) ABSTRACT

A power distribution unit includes a first power box including a first chamber having a first termination zone, wherein a first wire set from a supply conduit is configured to be terminated at the first termination zone. The power distribution unit also includes a second power box ganged together with the first power box. The second power box has a second chamber open to the first chamber, and the second chamber has a second termination zone. A second wire set from at least one of the supply conduit and the first termination zone is configured to be terminated at the second termination zone.

25 Claims, 8 Drawing Sheets

EXPANDABLE POWER DISTRIBUTION UNIT

BACKGROUND OF THE INVENTION

The subject matter herein relates generally to power distribution units, and more particularly to power distribution units having a plurality of power boxes ganged together.

Modular or manufactured wiring systems are known and in use today. Typical applications for manufactured wiring systems include modular office systems and raised floor systems. Modular office systems employ prefabricated modular wall units which are joined together in various configurations to divide a workspace into smaller offices or work areas. Such modular wall panels are typically equipped with raceways, for example along a bottom edge of the modular panels, for housing electrical cabling and electrical components such as power distribution units, junction boxes, power converters, and data network boxes for distributing power and/or data throughout the workspace. Raised floor systems employ floor panels that are elevated above a sub-floor and that provide voids for the electrical cabling and the electrical components.

Known manufactured wiring systems are not without problems. For instance, the electrical components, such as the power distribution units, have an enclosure that defines a predetermined envelope or configuration. The unit operates as a stand-alone component. Multiple units may be used in series with electrical cabling connecting the units to one another. In many cases, the electrical components typically limit the number of distributed circuits to twelve power circuits.

A need remains for modular electrical components that may be adapted to accommodate particular layouts of manufactured wiring systems in a cost effective and reliable manner. A need remains for modular electrical components that are flexible and/or expandable to fit a particular manufactured wiring system.

BRIEF DESCRIPTION OF THE INVENTION

In one embodiment, an expandable power distribution unit is provided that includes a first power box including a first chamber having a first termination zone, wherein a first wire set from a supply conduit is configured to be terminated at the first termination zone. The power distribution unit also includes a second power box ganged together with the first power box. The second power box has a second chamber open to the first chamber, and the second chamber has a second termination zone. A second wire set from at least one of the supply conduit and the first termination zone is configured to be terminated at the second termination zone.

Optionally, the first power box may include a first connector assembly defining a mating interface for a mating component of the manufactured wiring system, wherein the first connector assembly is configured to be electrically connected to the first wire set terminated at the first termination zone. The first power box may include a first terminal strip in the first termination zone, wherein the first terminal strip is configured to electrically terminate to the first wire set. Optionally, a wire set from a second supply conduit connected to a second supply source may be configured to be terminated at the first termination zone. The second supply source may be one of a building backup power source and a building primary power source. The first power box may have a polyhedron shape with an open side, and the second power source may have a polyhedron shape with an open side, where the open sides face one another and are joined by a joining part. Optionally, the power distribution unit may include a joining part separately provided from the first and second power boxes and spanning between the first and second power boxes with the first power box being fastened to the joining part and the second power box being fastened to the joining part. The joining part may provide access between the first and second chambers.

Optionally, the first power box may include a main body having a base wall and opposed end walls integrally formed with, and extending perpendicularly from, the base wall. The first power box may also include a side wall coupled to the main body with the side wall being oriented perpendicular to the base wall and the end walls. The first power box may also include a cover wall coupled to the main body with the cover wall being oriented perpendicular to the end walls and the side wall. The cover wall may be positioned generally opposite to the base wall, wherein the walls of the first power box define the first chamber. Optionally, the second power box may include a main body having a base wall and opposed end walls integrally formed with, and extending perpendicularly from, the base wall of the second power box. The second power box may also include a side wall coupled to the main body of the second power box with the side wall of the second power box being oriented perpendicular to the base wall and the end walls of the second power box. The second power box may include a cover wall coupled to the main body of the second power box with the cover wall of the second power box being oriented perpendicular to the end walls and the side wall of the second power box. The cover wall of the second power box may be positioned generally opposite to the base wall of the second power box, wherein the walls of the second power box define the second chamber.

In another embodiment, a power distribution unit is provided for distributing power to a manufactured wiring system that includes a first power box including a first chamber. The first power box includes a first connector assembly defining a mating interface for a mating component of the manufactured wiring system. A second power box is ganged together with the first power box. The second power box has a second chamber open to the first chamber, where the second power box includes a second connector assembly defining a mating interface for a mating component of the manufactured wiring system. At least one of the first and second power boxes includes a first opening configured to receive a first power supply conduit connected to a first power supply source. The first and second connector assemblies are electrically connected to the first power supply source. At least one of the first and second power boxes includes a second opening configured to receive a second power supply conduit connected to a second power supply source. The first and second connector assemblies are electrically connected to the second power supply source.

In a further embodiment, a power distribution kit for a manufactured wiring system is provided that includes a primary unit including a main body having a base wall and opposed end walls integrally formed with, and extending perpendicularly from, the base wall. The primary unit also includes two side walls and a cover wall. The power distribution kit also includes at least one supplementary unit, where each supplementary unit includes a main body, a cover wall and a joining part. The main body has a base wall and opposed end walls integrally formed with, and extending perpendicularly from, the base wall. The main body of each supplementary unit is substantially identical to the main body of the primary unit. The main and supplementary units cooperate to form a power distribution unit having at least two power boxes ganged together. Each main body is joined to an adjacent main body by a respective joining part, and the side walls are coupled to the outermost main bodies to form sides of the power distribution unit.

DETAILED DESCRIPTION OF THE INVENTION

Figure 1:
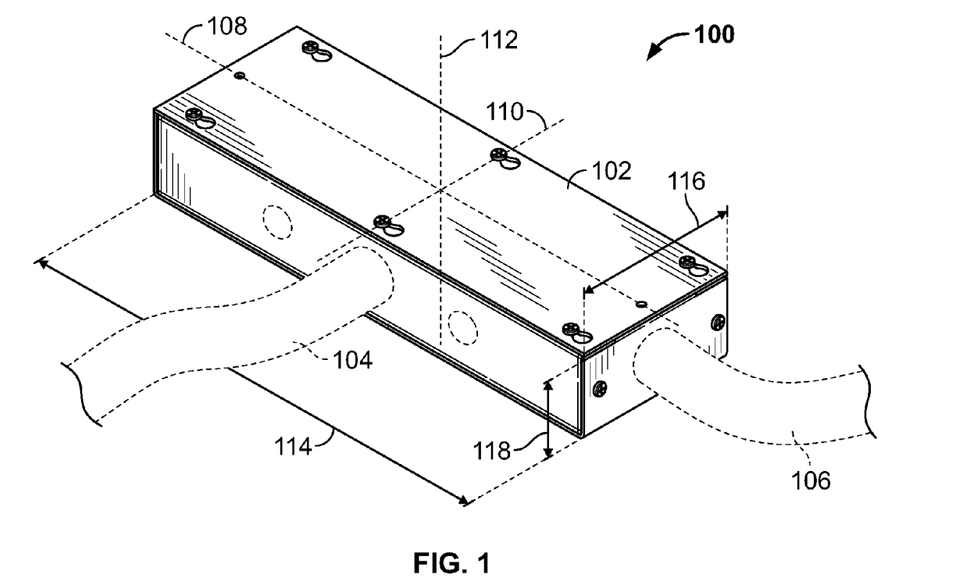
FIG. 1 is a top perspective view of a power distribution unit having one power box and formed in accordance with an exemplary embodiment.

FIG. 1 is a top perspective view of a power distribution unit 100 having one power box 102 formed in accordance with an exemplary embodiment. The power distribution unit 100 forms part of a manufactured wiring system. In an exemplary embodiment, the power distribution unit 100 is configured to distribute power from one power system to a different power system. For example, the power distribution unit 100 is configured to distribute power from a building power system to a manufactured wiring system. In the illustrated embodiment, the power distribution unit 100 receives power from a first conduit 104, which is represented schematically in FIG. 1, and transfers the power to a second conduit 106, which is also represented schematically in FIG. 1. Wire(s) of the conduits 104, 106 are electrically connected to one another within the power box 102. The wires may be electrically connected either directly or indirectly.

In the illustrated embodiment, the power box 102 is a polyhedron formed by flat polygonal faces. Optionally, the power box 102 may be a parallelepiped polyhedron having six faces, namely a top, a bottom, opposed sides and opposed ends. The power box 102 includes a longitudinal axis 108, a lateral axis 110 and a transverse axis 112, each perpendicular to one another. The longitudinal axis 108 extends through the ends, the lateral axis 110 extends through the sides and the transverse axis 112 extends through the top and bottom. The power box 102 has a length 114 measured along the longitudinal axis 108, a width 116 measured along the lateral axis 110 and a height 118 measured along the transverse axis 112. In alternative embodiments, the power box 102 may have other shapes, including non-polyhedron shapes.

Figure 2:
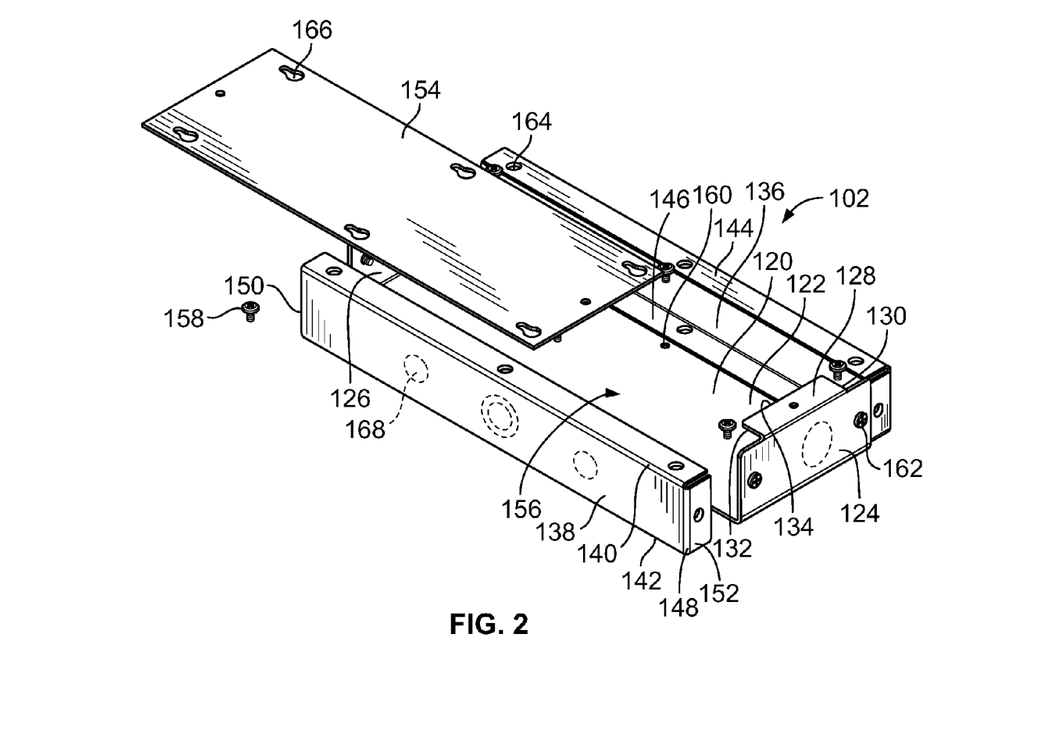
FIG. 2 is an exploded view of the power distribution unit shown in FIG. 1.

FIG. 2 is an exploded view of the power box 102. The power box 102 includes a main body 120 having a base wall 122 and opposed end walls 124, 126 integrally formed with the base wall 122. The end walls 124, 126 extend perpendicularly from the base wall 122. In an exemplary embodiment, the base wall 122 defines the bottom and the end walls 124, 126 define the end faces of the power box 102. Optionally, the main body 120 is stamped and formed from a blank or piece of metal stock. The base wall 122 has a length that is substantially equal to the length 114 (shown in FIG. 1) of the power box 102. The base wall 122 and the end walls 124, 126 have widths that are substantially equal to the width 116 (shown in FIG. 1) of the power box 102. The end walls 124, 126 have heights that are substantially equal to the height 118 (shown in FIG. 1) of the power box 102. In an exemplary embodiment, top flaps 128 extend perpendicularly from the end walls 124, 126 generally opposite to the base wall 122. The top flaps 128 include side edges 130, 132 and an end edge 134.

The power box 102 includes opposed side walls 136, 138. In an exemplary embodiment, the side walls 136, 138 define the side faces of the power box 102. Optionally, the side walls 136, 138 may be stamped and formed from a blank or piece of metal stock. The side walls 136, 138 have lengths that are substantially equal to the length 114 of the power box 102. The side walls 136, 138 have heights that are substantially equal to the height 118 of the power box 102. In an exemplary embodiment, each side wall 136, 138 includes a top edge 140 and a bottom edge 142. A top flange 144 extends perpendicularly from, and generally inwardly from, the respective top edge 140. A bottom flange 146 extends perpendicularly from, and generally inwardly from, the respective bottom edge 142. Each side wall 136, 138 includes opposed end edges 148, 150. End flanges 152 extend perpendicularly from, and generally inwardly from, the respective end edge 148, 150.

The power box 102 includes a cover wall 154. In an exemplary embodiment, the cover wall 154 defines the top face of the power box 102. Optionally, the cover wall 154 may be stamped and formed from a blank or piece of metal stock. The cover wall 154 has a length that is substantially equal to the length 114 of the power box 102. The cover wall 154 has a width that is substantially equal to the width 116 of the power box 102.

The main body 120, side walls 136, 138 and cover wall 154 are coupled to one another to form the power box 102. When assembled, the power box 102 forms a chamber 156 or space bounded by the respective walls. When assembled, the side walls 136, 138 may at least partially overlap the main body 120. For example, the bottom flange 146 may overlap a portion of the base wall 122 and/or the end flanges 152 may at least partially overlap a portion of the end walls 124, 126. The flanges 146, 152 may be positioned on an interior of the respective walls. In an exemplary embodiment, when assembled, the bottom edges 142 of the side walls 136, 138 may abut or otherwise coincide with the corresponding edges of the base wall 122 and the end edge 148, 150 may abut or otherwise coincide with the corresponding edges of the end walls 124, 126. Optionally, when assembled, the top flanges 144 may abut the corresponding side edges 130, 132 of the top flaps 128. As such, the top flaps 128 may be used to position the side walls 136, 138 during assembly.

In an exemplary embodiment, fasteners 158, such as screws, may be used to fasten the walls to one another. For example, the base wall 122 may include openings 160, the end walls 124, 126 may include openings 162, the side walls 136, 138 may include openings 164 and the cover wall 154 may include openings 166. The fasteners 158 extend through the openings 160 and 164 in the base wall 122 and side walls 136, 138, respectively, to couple the side walls 136, 138 to the base wall 122. The fasteners 158 extend through the openings 162 and 164 in the end walls 124, 126 and side walls 136, 138, respectively, to couple the side walls 136, 138 to the end walls 124, 126. The fasteners 158 extend through the openings 164 and 166 in the side walls 136, 138 and cover wall 154, respectively, to couple the cover wall 154 to the side walls 136, 138. The fasteners 158 and openings are illustrative of one type of fastening means and process to assemble the power box 102, and other types of fasteners, such as rivets, pins, latches, ties and the like, and or other means, such as soldering, welding, bonding, stamping and forming, and the like, may be utilized in alternative embodiments to form the power box 102.

In an exemplary embodiment, at least one of the walls may include a knockout(s) 168 for receiving conduits, connectors, or other power supply components therethrough. The knockouts 168 are configured to be removed to provide an opening in the respective wall. For example, in the illustrated embodiment, the side walls 136, 138 and the end walls 124, 126 include knockouts 168. Optionally, different sized and/or shaped knockouts 168 may be provided in the walls to accommodate different sized and/or shaped components or conduits. The knockouts 168 may be formed by perforating or scoring the wall such that the knockout 168 may be punched out of the wall by an installer. In alternative embodiments, the openings may be created by drilling or otherwise cutting an opening in the wall to accommodate the component or the conduit.

Figure 3:
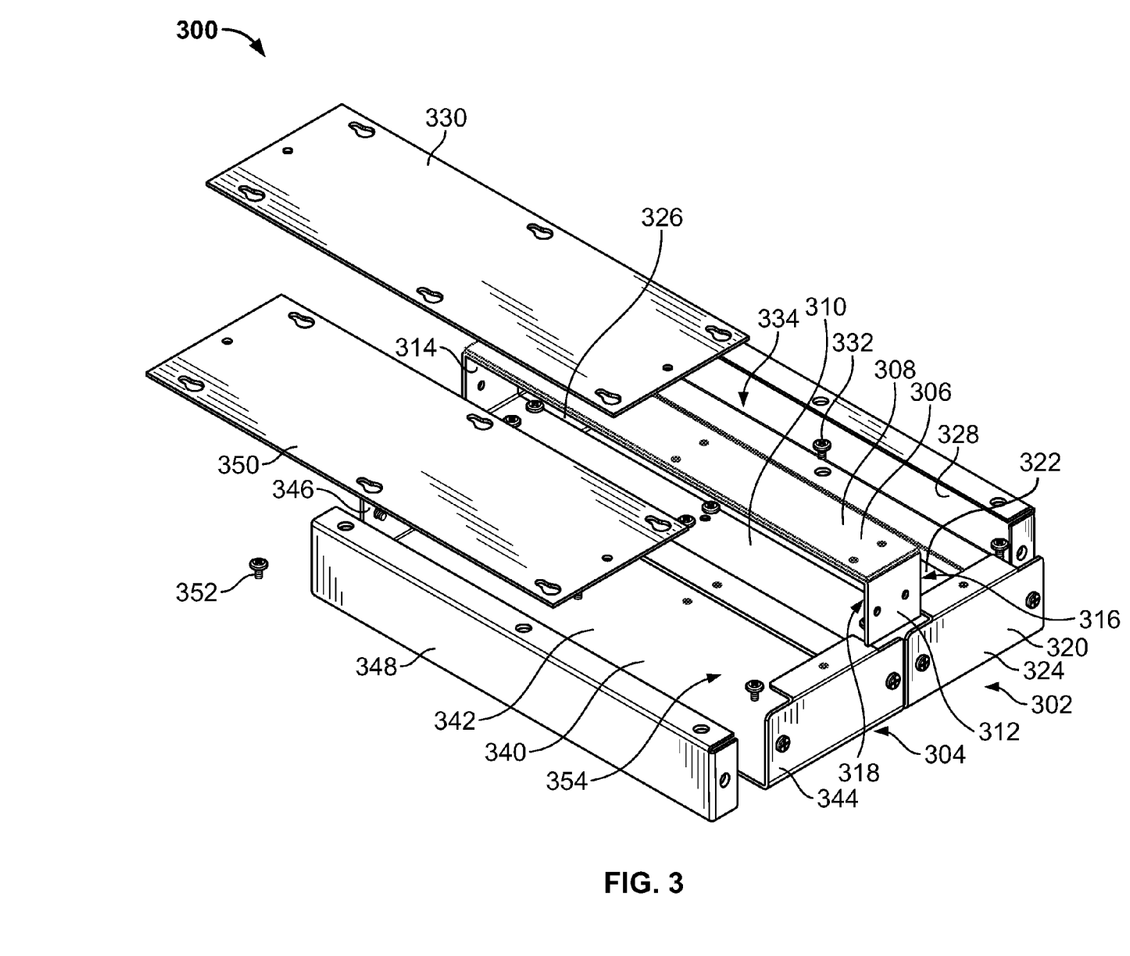
FIG. 3 is an exploded view of an alternative power distribution unit having two power boxes ganged together in accordance with an exemplary embodiment.

FIG. 3 is an exploded view of an alternative power distribution unit 300 having two power boxes 302, 304 ganged together in accordance with an exemplary embodiment. The power boxes 302, 304 are similar to the power box 102 (shown in FIG. 1). Optionally, the power boxes 302, 304 may be substantially identical to the power box 102 such that the power distribution unit 300 is essentially two of the power boxes 102 coupled together. For example, one of the side walls of each power box 102 may be removed and then the power boxes may be joined together. The walls of the power boxes 102 may be directly coupled to one another, or alternatively, as with the embodiment illustrated in FIG. 3, a coupling band may be used to couple the power boxes 102 to one another. In the illustrated embodiment, the boxes have a modular design that allow a plurality of boxes (e.g. two boxes in the embodiment illustrated in FIG. 3) to be ganged together to increase the capacity, functionality and/or application of the power distribution unit. In the illustrated embodiment, the power boxes 302, 304 are formed and/or assembled by coupling a plurality of components together. The power boxes 302, 304 are ganged to one another side-by-side such that the power boxes 302, 304 form a single power distribution unit 300.

In an exemplary embodiment, the power boxes 302, 304 are ganged together such that the power distribution unit 300 has a footprint that is approximately twice the footprint (e.g. surface area) and/or volume of the power box 102. The power boxes 302, 304 are ganged together such that exactly one face of each power box 302, 304 is shared. Optionally, the shared face of each power box 302, 304 may be entirely shared. In an exemplary embodiment, the power boxes 302, 304 are sized and/or shaped such that, when ganged, only one of a length, width and height of the power distribution unit 300 is increased. In the illustrated embodiment, only the width of the power distribution unit 300 is increased when the power boxes 302, 304 are ganged. In an exemplary embodiment, the first and second power boxes 302, 304 are substantially identically formed such that manufacture of the power boxes 302, 304 is simplified and ganging is easily accomplished.

The power distribution unit 300 includes a joining part 306 that is used to join the first and second power boxes 302, 304 to one another. The joining part 306 includes a top 308, a bottom 310, opposed ends 312, 314 and opposed, open sides 316, 318. More or less sections may be provided in alternative embodiments. The joining part 306 may be stamped and formed into a continuous band having a passageway therethrough that allows access between the first and second power boxes 302, 304. The joining part 306 is separately provided from both the first power box 302 and the second power box 304. The joining part 306 is configured to span between, or bridge, the first and second power boxes 302, 304. The joining part 306 is coupled to the first power box 302 and is coupled to the second power box 304. As such, the joining part 306 is used to couple the first power box 302 to the second power box 304.

The first power box 302 includes a main body 320 having a base wall 322 and opposed end walls 324, 326 integrally formed with the base wall 322. The end walls 324, 326 extend perpendicularly from the base wall 322. The first power box 302 includes a side wall 328. In an exemplary embodiment, the side face opposite to the side wall 328 is open. The first power box 302 includes a cover wall 330. Fasteners 332 may be utilized to couple the various walls together. The fasteners 332 may similarly be used to couple the joining part 306 to the main body 320 and/or the cover wall 330. Once assembled, the first power box 302 defines a first chamber 334. The first chamber 334 is enclosed by the walls 322-330 and is open sided on the side opposite to the side wall 328.

The second power box 304 includes a main body 340 having a base wall 342 and opposed end walls 344, 346 integrally formed with the base wall 342. The end walls 344, 346 extend perpendicularly from the base wall 342. The second power box 304 includes a side wall 348. In an exemplary embodiment, the side face opposite to the side wall 348 is open. The second power box 304 includes a cover wall 350. Fasteners 352 may be utilized to couple the various walls together. The fasteners 352 may similarly be used to couple the joining part 306 to the main body 340 and/or the cover wall 350. Once assembled, the second power box 304 defines a second chamber 354. The second chamber 354 is enclosed by the walls 342-350 and is open sided on the side opposite to the side wall 348. The second chamber 354 is open to the first chamber 334.

Figure 4:
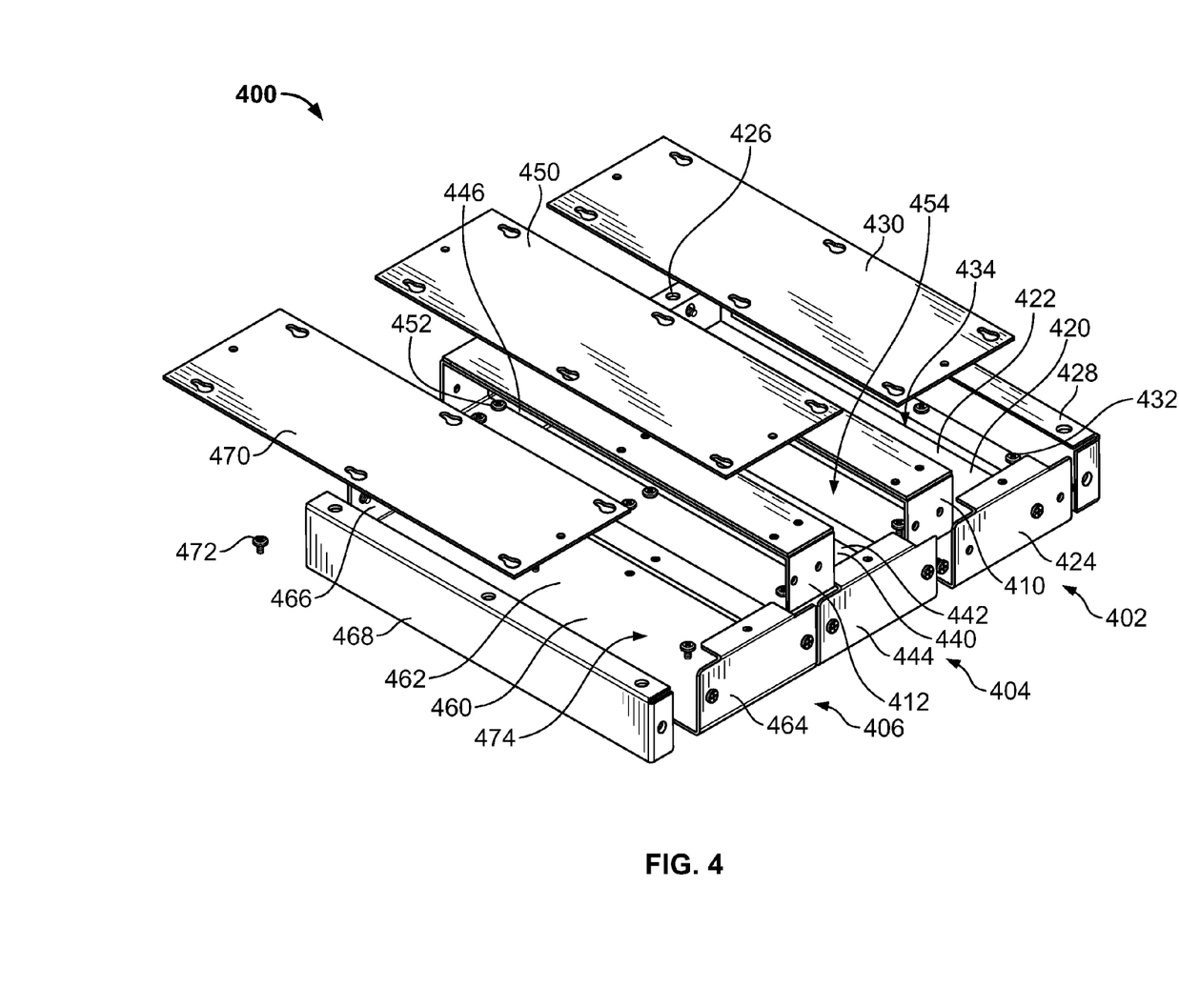
FIG. 4 is an exploded view of another alternative power distribution unit having three power boxes ganged together in accordance with an exemplary embodiment.

FIG. 4 is an exploded view of another alternative power distribution unit 400 having three power boxes 402, 404, 406 ganged together in accordance with an exemplary embodiment. The power boxes 402, 404, 406 are similar to the power box 102 (shown in FIG. 1). The boxes have a modular design that allow a plurality of boxes (e.g. three boxes in the embodiment illustrated in FIG. 4) to be ganged together to increase the capacity, functionality and/or application of the power distribution unit. In the illustrated embodiment, the power boxes 402, 404, 406 are formed and/or assembled by coupling a plurality of components together. The power boxes 402, 404, 406 are ganged to one another side-by-side such that the power boxes 402, 404, 406 form a single power distribution unit 400.

In an exemplary embodiment, the power boxes 402, 404 are ganged together such that the power distribution unit 400 has a footprint that is approximately three times the footprint (e.g. surface area) and/or volume of the power box 102. The power boxes 402, 404, 406 are ganged together such that opposed side faces of the second (e.g. middle) power box 404 is shared with one side face of each of the first and third (e.g. outer) power boxes 402, 406.

The power distribution unit 400 includes a first joining part 410 that is used to join the first and second power boxes 402, 404 to one another. The power distribution unit 400 includes a second joining part 412 that is used to join the second and third power boxes 404, 406 to one another. The first and second joining parts 410, 412 may be identical to one another. The first and second joining parts 410, 412 may be substantially similar to the joining part 306 illustrated in FIG. 3. The joining parts 410, 412 are separately provided from the power boxes 402, 404, 406 and are used to couple the power boxes 402, 404, 406 to one another.

The first power box 402 includes a main body 420 having a base wall 422 and opposed end walls 424, 426 integrally formed with the base wall 422. The end walls 424, 426 extend perpendicularly from the base wall 422. The first power box 402 includes a side wall 428. In an exemplary embodiment, the side face opposite to the side wall 428 is open. The first power box 402 includes a cover wall 430. Fasteners 432 may be utilized to couple the various walls together. The fasteners 432 may similarly be used to couple the joining part 410 to the main body 420 and/or the cover wall 430. Once assembled, the first power box 402 defines a first chamber 434. The first chamber 434 is enclosed by the walls 422-430 and is open sided on the side opposite to the side wall 428.

The second power box 404 defines an interior power box and does not include any side walls. The second power box 404 includes a main body 440 having a base wall 442 and opposed end walls 444, 446 integrally formed with the base wall 442. The end walls 444, 446 extend perpendicularly from the base wall 442. In an exemplary embodiment, the side faces of the second power box 404 are open. The second power box 404 includes a cover wall 450. Fasteners 452 may be utilized to couple the various walls together. The fasteners 452 may similarly be used to couple the joining parts 410 and/or 412 to the main body 440 and/or the cover wall 450. Once assembled, the second power box 404 defines a second chamber 454. The second chamber 454 is enclosed by the walls 442-450 and is open sided on both sides. The second chamber 454 is open to the first chamber 434. Optionally, more than one interior power box similar to the second power box 404 may be provided between the first and third power boxes 402, 406.

The third power box 406 includes a main body 460 having a base wall 462 and opposed end walls 464, 466 integrally formed with the base wall 462. The end walls 464, 466 extend perpendicularly from the base wall 462. The third power box 406 includes a side wall 468. In an exemplary embodiment, the side face opposite to the side wall 468 is open. The third power box 406 includes a cover wall 470. Fasteners 472 may be utilized to couple the various walls together. The fasteners 472 may similarly be used to couple the joining part 412 to the main body 460 and/or the cover wall 460. Once assembled, the third power box 406 defines a third chamber 474. The third chamber 474 is enclosed by the walls 462-470 and is open sided on the side opposite to the side wall 468. The third chamber 474 is open to the first and second chambers 434, 454.

In an exemplary embodiment, the power distribution units 100, 300 and/or 400 may be arranged, sold and/or assembled as a power distribution kit. For example, various kits may be arranged, sold and/or assembled to form the various power distribution units 100, 300 and/or 400. In an exemplary embodiment, two types of kits may be arranged, sold and/or assembled to form power distribution units of any size. For example, a primary unit may be utilized along with any number of supplementary units to form different types of power distribution units.

Optionally, the primary unit alone may be used to form the power distribution unit 100. As such, the primary unit forms a single box power distribution unit. In an exemplary embodiment, the primary unit includes one main body 120, two side walls 136, 138 and a cover wall 154. The primary unit may optionally include any hardware needed to assemble the power distribution unit.

The supplementary unit(s) is used to supplement and expand the primary unit. Such expansion allows multiple components to be ganged together to increase the capacity, functionality and/or application of the power distribution unit. Thus a modular, flexible system is utilized to distribute power to a manufactured wiring system. For example, utilizing one supplementary unit, in combination with the primary unit, forms a two box power distribution unit, such as the power distribution unit 300 (shown in FIG. 3). Utilizing two supplementary unit, in combination with the primary unit, forms a three box power distribution unit, such as the power distribution unit 400 (shown in FIG. 4).

In an exemplary embodiment, each supplementary unit includes one main body 320, one joining part 306, and one cover wall 330. When used in combination with the primary unit, the joining part 306 is positioned between the main body supplied with the primary unit and the main body supplied with the supplementary unit. The side walls provided with the primary unit are positioned on the outer sides of the power distribution unit. For example, one side wall is coupled to one main body and the other side wall is coupled to the other main body. Other supplementary units may be supplied and ganged together as desired.

The power distribution kit may have other configurations in alternative embodiments. For example, the kit may include primary unit(s) that include one main body, two side walls and a cover wall and supplementary unit(s) that include a joining part. Any number of primary units and supplementary units may be combined as desired, where the number of supplementary units is typically one less than the number of primary units. When assembled, one or both side walls from the primary unit may not be used to form the power distribution unit.

Figure 5:
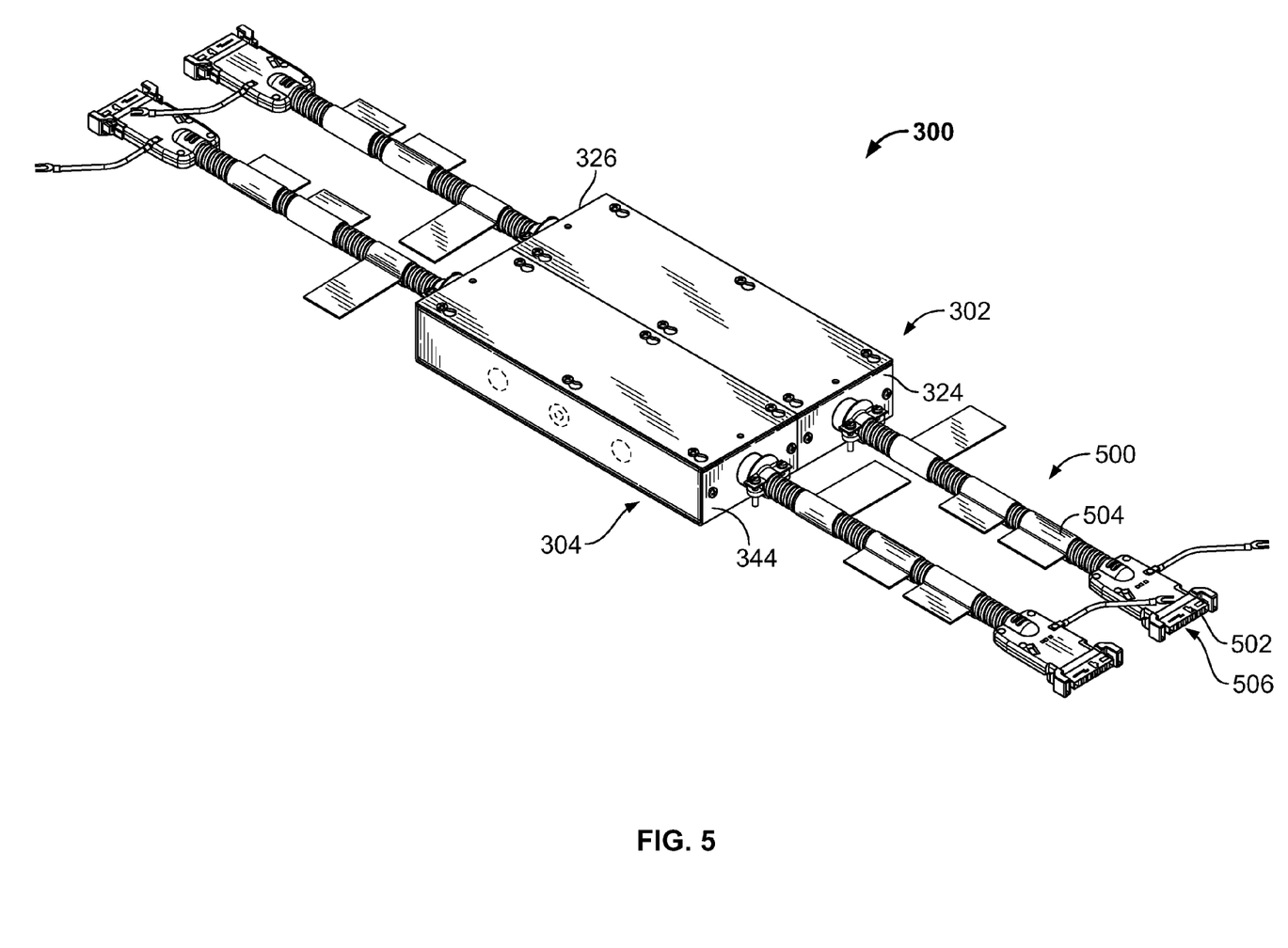
FIG. 5 is an assembled view of the power distribution unit shown in FIG. 3 having exemplary connector assemblies extending from the power boxes.

FIG. 5 is an assembled view of the power distribution unit 300 having exemplary connector assemblies 500 extending from the power boxes 302, 304. In the illustrated embodiment, a different connector assembly 500 extends from each end wall 324, 326, 344, 346. The connector assemblies 500 include a connector 502 at an end of a conduit 504. Optionally, the conduit 504 may include a hollow, flexible metal tube having a plurality of individual wires therein. The wires may be terminated to the connector 502. Any number of wires may be provided, however five wire and eight wire systems are typical of manufactured wiring systems.

The connector 502 defines a mating interface 506 for a mating cable assembly and/or connector (not shown) of the manufactured wiring system. For example, the mating cable assembly may be part of a power strip that is powered by the power distribution unit 300 via the connector assembly 500. Alternatively, the mating cable assembly may be a power-to-power cable that interconnects with a connector assembly of a component of the manufactured wiring system similar to the connector assembly 500. The component may be, but is not limited to, a junction box, a power converter, a power distribution unit, a zone box, a data network boxes, and the like. In other alternative embodiments, rather than a mating cable assembly, the connector 502 may be directly connected to a mating connector of a component of the manufactured wiring system.

Figure 6:
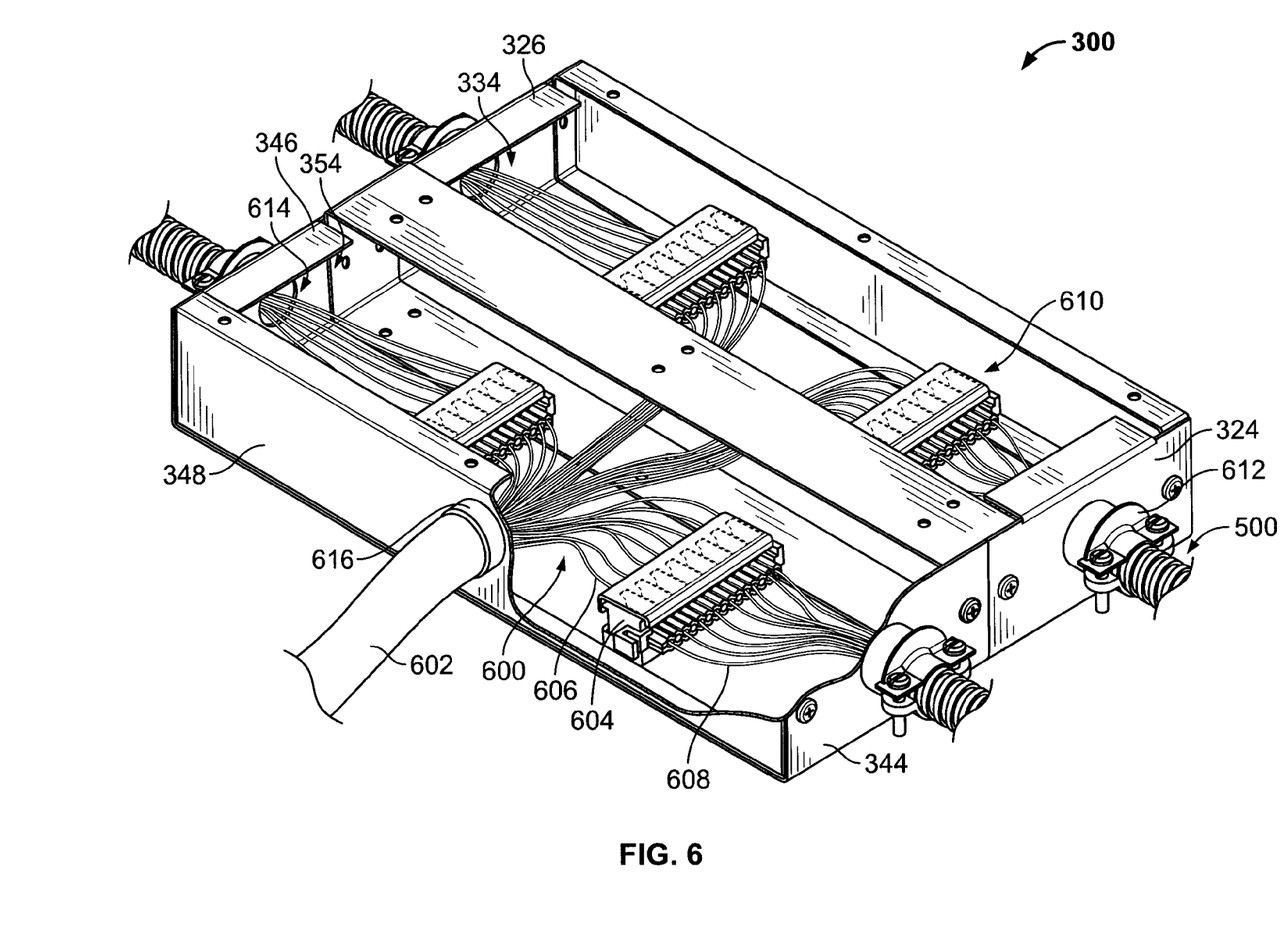
FIG. 6 is a partial cutaway view of the power distribution unit shown in FIG. 5 illustrating the connector assemblies terminated to wire sets of a power supply conduit using a terminal strip.

FIG. 6 is a partial cutaway view of the power distribution unit 300 illustrating the connector assemblies 500 terminated to wire sets 600 of a power supply conduit 602 using a terminal strip 604. The cover walls 330, 350 (shown in FIG. 3) are removed for clarity. A portion of the end wall 344 and side wall 348 are cut away for clarity.

The wire sets 600 include a plurality of individual wires 606. The connector assemblies 500 include individual wires 608. The wires 606 of each wire set 600 are terminated to a different terminal strip 604. Similarly, the wires 608 of each connector assembly 500 are terminated to a different terminal strip 604. The terminal strips 604 may have any form to accommodate and electrically interconnect the wires 606 of the wire sets 600 with the individual wires 608 of the corresponding connector assemblies 500. Each terminal strip 604 is arranged within and/or defines a termination zone 610 within the power boxes 302, 304. The wires 606, 608 are terminated within a respective termination zone 610. In the illustrated embodiment, eight wires 606 are provided with each wire set 600 and eight wires 608 are provided with each connector assembly 500.

The connector assemblies 500 include conduit connectors 612 that couple the conduit 504 to the respective end wall 324, 326, 344, 346. The wires 608 extend through openings 614 in the end walls 324, 326, 344, 346 into the first and/or second chambers 334, 354. The wires 608 are terminated to the corresponding terminal strip 604.

The power supply conduit 602 includes a conduit connector 616 that couples the power supply conduit 602 to the side wall 348. The power supply conduit 602 includes a plurality of the wire sets 600. Any number of wire sets 600 may be provided within the power supply conduit 602. Additionally, any number of power supply conduits may be provided to supply power to the power distribution unit 300. The wires 606 of the wire sets 600 are terminated to a power source, either directly or indirectly. The power source may be any power source, examples may include a building main power supply, a building backup or emergency power supply, another manufactured wiring system, and the like. The wires 606 extend through the side wall 348 into the first and/or second chambers 334, 354. The wires 606 are terminated to the corresponding terminal strip 604. The terminal strip 604 electrically connects certain wires 606 of the power supply with certain wires 608 of the connector assembly 500. Other means or components may be used in alternative embodiments to interconnect the wires 606 with the wires 608.

Figure 7:
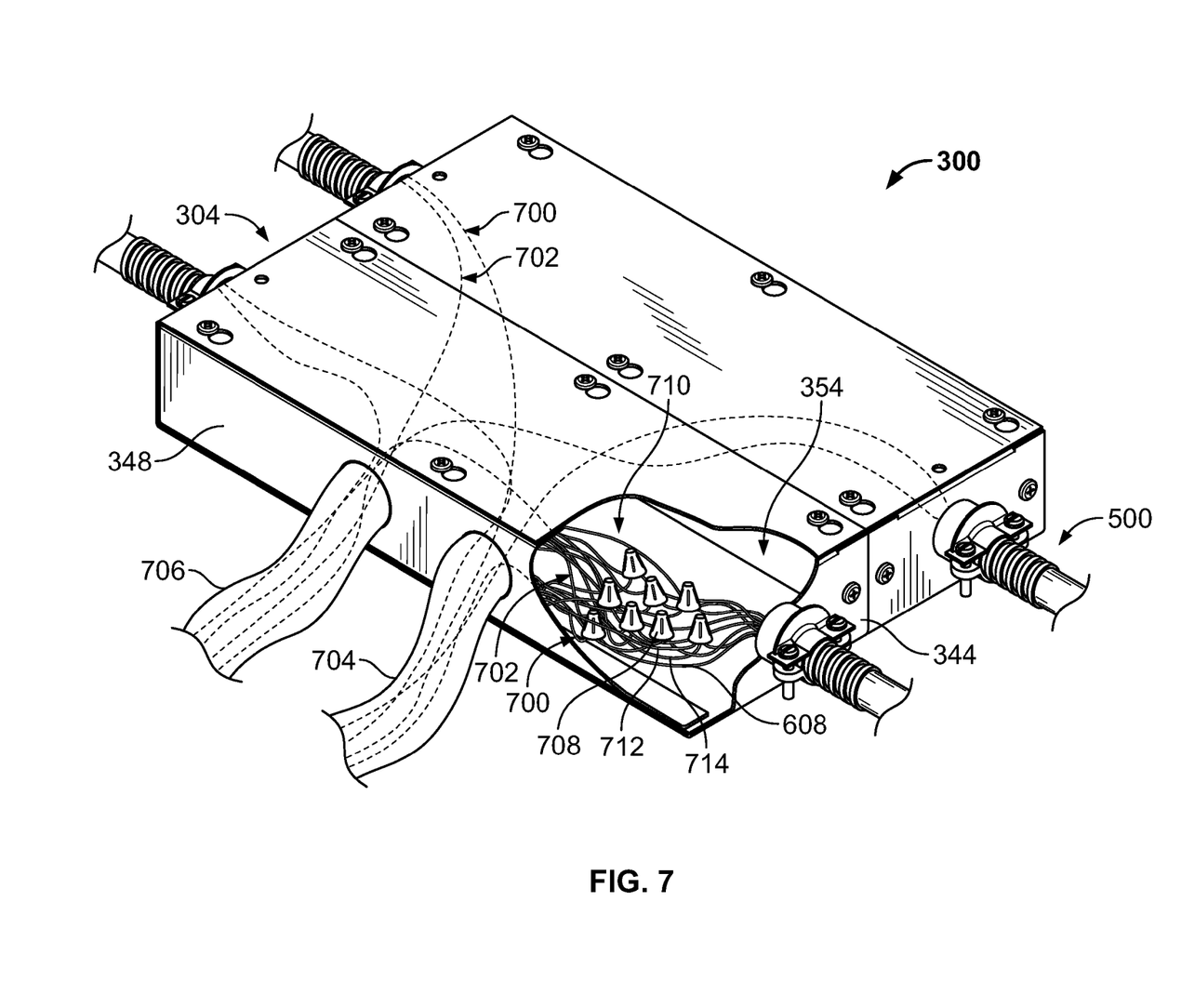
FIG. 7 is a partial cutaway view of the power distribution unit shown in FIG. 5 illustrating the connector assemblies terminated to wire sets of a power supply conduit using wire nuts.

FIG. 7 is a partial cutaway view of the power distribution unit 300 illustrating the connector assemblies 500 terminated to first and second wire sets 700, 702 of first and second power supply conduits 704, 706 using wire nuts 708. In contrast to the embodiment illustrated in FIG. 6, the embodiment illustrated in FIG. 7, includes two power supply conduits 704, 706. Both power supply conduits 704, 706 are connected to the side wall 348. Optionally, the power supply conduits 704, 706 supply power from different power sources, such as a main power source and a backup or emergency power source. FIG. 7 illustrates the wire sets 700, 702 of the power supply conduits 704, 706 terminated to the individual wires 608 of the connector assembly 500 attached to the end wall 344 of the second power box 304. The other wire sets 700, 702 are illustrated schematically as being terminated to the other connector assemblies.

The wires 608 are terminated within a termination zone 710. The termination zone 710 is generally defined within the chamber 354 of the second power box 304. The termination zone 710 is generally defined by the walls of the power box 304. Optionally, the termination zone 710 may be positioned proximate the end wall 344. The termination zone 710 may be three dimensional. The termination zone 710 is large enough to accommodate all of the wires 608 and the wire nuts 708. In an exemplary embodiment, the power distribution unit 300 may include multiple termination zones 710, such as one termination zone 710 associated with each connector assembly 500 and/or supply conduit 704, 706.

In an exemplary embodiment, one of the wire nuts 708 is utilized to electrically connect a first supply wire 712 of the first wire set 700 and a second supply wire 714 of the second wire set 702 with one of the wires 608 of the connector assembly 500. As such, each wire 608 of the connector assembly 500 is electrically connected to, and is capable of receiving power from, both power supplies.

Figure 8:
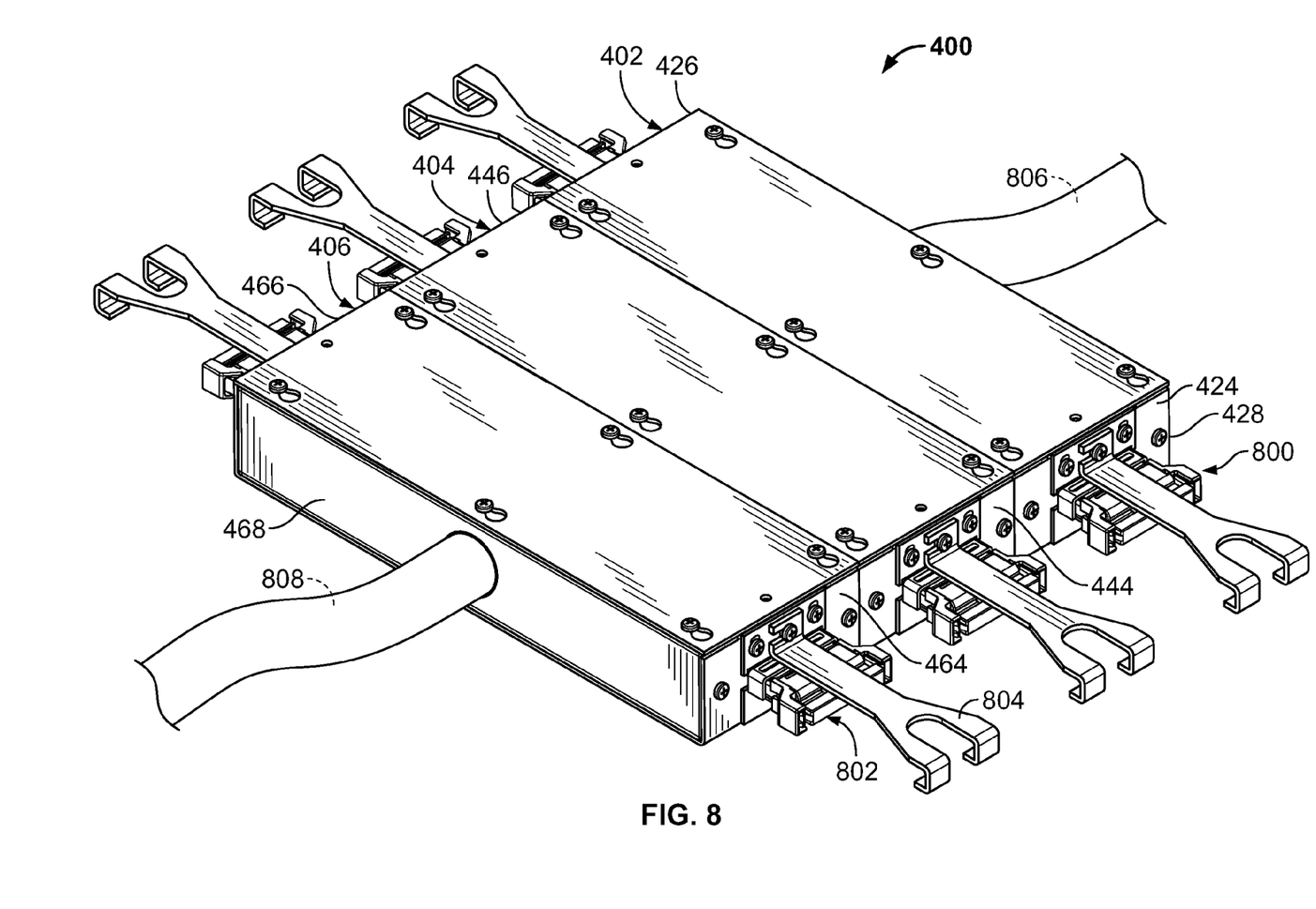
FIG. 8 is an assembled view of the power distribution unit shown in FIG. 4 having exemplary connector assemblies extending from the power boxes.

FIG. 8 is an assembled view of the power distribution unit 400 having exemplary connector assemblies 800 extending from the power boxes 402, 404, 406. The connector assemblies 800 are directly connected to the end walls 424, 426, 444, 446, 464, 466. The connector assemblies 800 define mating interfaces 802 for a mating cable assembly and/or connector (not shown) of the manufactured wiring system. A strain relief element 804 may be provided for the mating cable assembly.

In an exemplary embodiment, first and second power supply conduits 806, 808 are coupled to the power distribution unit 400. The first power supply conduit 806 is connected to the first side wall 428 and the second power supply conduit 808 is connected to the second side wall 468. Each supply conduit 806, 808 may include a plurality of wire sets (not shown) that are connected to selected ones of the connector assemblies 800. Optionally, a wire set from each supply conduit 806, 808 may be electrically connected to each connector assembly 800. For example, each connector assembly 800 may include individual wires that are directly terminated to the wires of the wire sets, such as with wire nuts, or that are indirectly terminated to the wires of the wire sets, such as by terminal strips. In another alternative embodiment, a single wire set from either supply conduit 806, 808 may be electrically connected to multiple (e.g. more than one) connector assembly 800. For example, the wires from one of the connector assemblies 800 may be connected with the wires of another of the connector assemblies and the wire set, either directly (e.g. with a wire nut) or indirectly (e.g. using a terminal strip, a terminal block, a buss bar and the like). Optionally, a wire harness or pigtail may be used to interconnect the wires of one of the connector assemblies 800 with the wires from another connector assembly 800 or with the wires from the wire set.

Figure 9:
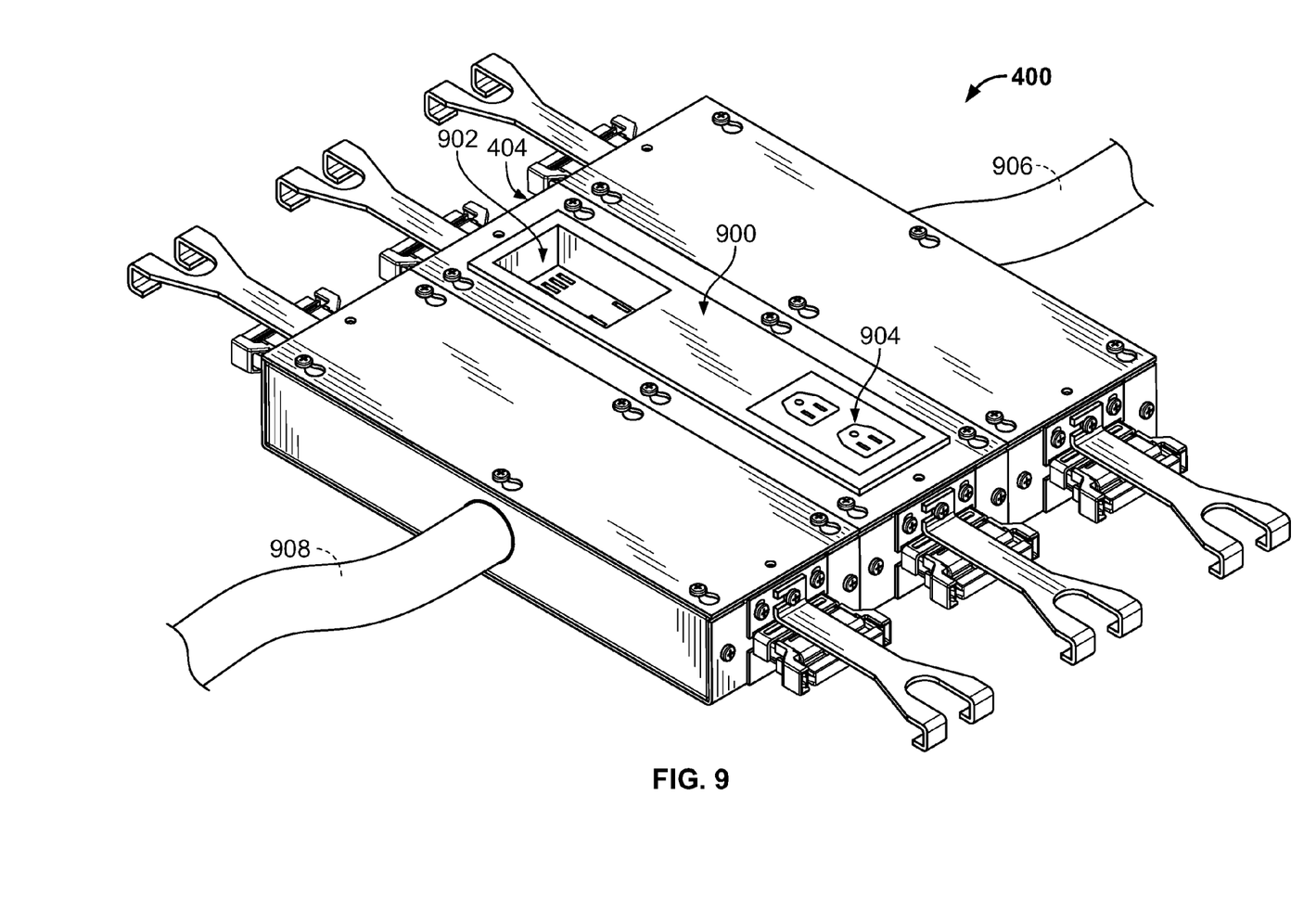
FIG. 9 is an assembled view of the power distribution unit shown in FIG. 4 having a junction box provided in one of the power boxes.

FIG. 9 is an assembled view of the power distribution unit 400 having a junction box 900 provided in the second power box 404. The junction box 900 includes a plurality of sockets 902 that receive modular power receptacles 904 therein. The sockets 902, and thus the power receptacles 904 are electrically connected to wires of a first power supply conduit 906 and/or a second power supply conduit 908.

A modular power distribution unit 100, 300, 400 is thus provided to distribute power from a building power system to a manufactured wiring system. A plurality of power boxes 102, 302, 304, 402, 404, 406 are capable of being ganged together to increase the capacity, functionality and/or application of the power distribution unit. In the illustrated embodiment, the power boxes 102, 302, 304, 402, 404, 406 are formed and/or assembled by coupling a plurality of components together. Joining parts 306, 410, 412 are utilized to join the various components together. When the power boxes 102, 302, 304, 402, 404, 406 are joined, each of the chambers 156, 334, 354, 434, 454, 474 of the power boxes 102, 302, 304, 402, 404, 406 are open to one another, which allows the wires from the wire sets, the connector assemblies and/or wire harnesses to be routed to different termination zones 610, 710 to interconnect the individual wires. Optionally, the power distribution units 100, 300 and/or 400 may be arranged, sold and/or assembled as a power distribution kit. For example, a primary unit(s) may be utilized along with any number of supplementary units to form different types of power distribution units having different numbers of power boxes.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An expandable power distribution unit, the power distribution unit comprising:
   a first power box including a plurality of walls defining a first chamber, the chamber having a first termination zone, wherein a first wire set from a supply conduit is configured to be terminated at the first termination zone;
   a second power box separate and discrete from the first power box, the second power box having a plurality of walls defining a second chamber, the second power box being ganged together with the first power box such that the second chamber is open to the first chamber, the second chamber having a second termination zone, wherein a second wire set from at least one of the supply conduit and the first termination zone is configured to be terminated at the second termination zone; and
   a joining part separate and discrete from the first and second power boxes, the first power box being joined to the joining part and the second power box being joined to the joining part to gang the first and second power boxes to each other.

2. The power distribution unit of claim 1, wherein the first power box includes a first connector assembly defining a mating interface for a mating component of a manufactured wiring system, the first connector assembly being configured to be electrically connected to the first wire set terminated at the first termination zone.

3. The power distribution unit of claim 1, wherein the first power box includes a first terminal strip in the first termination zone, the first terminal strip being configured to electrically terminate to the first wire set.

4. The power distribution unit of claim 1, wherein the supply conduit is connected to a first supply source, and wherein a wire set from a second supply conduit connected to a second supply source is configured to be terminated at the first termination zone, the second supply source being one of a building backup power source and a building primary power source.

5. The power distribution unit of claim 1, wherein the first power box has a polyhedron shape with an open side, the second power box has a polyhedron shape with an open side, the first and second power boxes being positioned side by side such that the open sides face one another, the first and second chambers cooperating to define a common chamber.

6. The power distribution unit of claim 1, wherein the joining part spans between the first and second power boxes, the first power box overlapping a portion of the joining part and being fastened to the joining part, the second power box overlapping a portion of the joining part and being fastened to the joining part, and the joining part providing access between the first and second chambers.

7. The power distribution unit of claim 1, wherein the first power box includes a main body defining multiple ones of the plurality of walls, the main body having a base wall and opposed end walls integrally formed with, and extending perpendicularly from, the base wall, the first power box includes a side wall coupled to the main body, the side wall being oriented perpendicular to the base wall and the end walls, the first power box includes a cover wall coupled to the main body, the cover wall being oriented perpendicular to the end walls and the side wall, the cover wall being positioned generally opposite to the base wall, the walls of the first power box define the first chamber.

8. The power distribution unit of claim 7, wherein the second power box includes a main body defining multiple ones of the plurality of walls, the main body of the second power box having a base wall and opposed end walls integrally formed with, and extending perpendicularly from, the base wall of the second power box, the second power box includes a side wall coupled to the main body of the second power box, the side wall of the second power box being oriented perpendicular to the base wall and the end walls of the second power box, the second power box includes a cover wall coupled to the main body of the second power box, the cover wall of the second power box being oriented perpendicular to the end walls and the side wall of the second power box, the cover wall of the second power box being positioned generally opposite to the base wall of the second power box, the walls of the second power box define the second chamber.

9. The power distribution unit of claim 8, wherein each of the side walls includes a wall portion defined by edges, a plurality of flanges extend perpendicular from the wall portion at respective edges, the flanges extending at least partially into the respective chambers.

10. The power distribution unit of claim 1, wherein the joining part has opposed main walls and opposed end walls extending between the main walls, at least one of the main walls being coupled to the first and second power boxes, the joining part having open sides between the main walls and end walls, with the open sides being open to the first and second chambers.

11. The power distribution unit of claim 1, further comprising a third power box ganged together with at least one of the first and second power boxes, the third power box having a third chamber open to at least one of the first and second chambers, the third chamber having a third termination zone, wherein a third wire set from at least one of the supply conduit, the first termination zone and the second termination zone is configured to be terminated at the third termination zone.

12. The power distribution unit of claim 1, wherein the first and second power boxes have similar sizes and shapes, the first chamber having an open side, the second chamber having an open side, the first and second power boxes being ganged together such that the open sides abut one another, the first and second chambers being open to one another through the open sides.

13. An expandable power distribution unit for distributing power to a manufactured wiring system, the power distribution unit comprising:
a first power box having a plurality of walls enclosing a first chamber, the first power box including a first connector assembly defining a mating interface for a mating component of the manufactured wiring system; and a second power box ganged together with the first power box by a separate respective joining part, the second power box having a plurality walls enclosing a second chamber open to the first chamber, the second power box including a second connector assembly defining a mating interface for a mating component of the manufactured wiring system, wherein at least one of the first and second power boxes includes a first opening configured to receive a first power supply conduit connected to a first power supply source, the first and second connector assemblies being electrically connected to the first power supply source, and wherein at least one of the first and second power boxes includes a second opening configured to receive a second power supply conduit connected to a second power supply source, the first and second connector assemblies being electrically connected to the second power supply source.

14. The power distribution unit of claim 13, wherein at least one of the first and second power supply sources are a building backup power source.

15. The power distribution unit of claim 13, wherein the first power supply conduit includes a plurality of wire sets, the first connector assembly being electrically coupled to a first of the wire sets within the first chamber, the second connector assembly being electrically coupled to a second of the wire sets within the second chamber, at least one of the first and second wire sets being configured to extend through an opening between the first and second power boxes.

16. The power distribution unit of claim 13, wherein the first power box includes a first terminal strip within the first chamber, the first connector assembly being terminated to the first terminal strip, the second power box includes a second terminal strip within the second chamber, the second electrical connector being terminated to the second terminal strip, the first power supply conduit being configured to be terminated to the first and second terminal strips, the second power supply conduit being configured to be terminated to the first and second terminal strips.

17. The power distribution unit of claim 13, wherein the first power box includes a first termination zone within the first chamber, the first connector assembly being electrically terminated to the first power supply conduit and the second power supply conduit in the first termination zone, and wherein the second power box includes a second termination zone within the second chamber, the second connector assembly being electrically terminated to the first power supply conduit and the second power supply conduit in the second termination zone.

18. The power distribution unit of claim 13, further comprising a junction box being received in the first power box, the first and second power supplies being configured to be terminated to the junction box, the junction box being configured to receive at least one power receptacle.

19. The power distribution unit of claim 13, wherein the first power box encloses the first chamber such that the first chamber has an open side, and wherein the second power box encloses the second chamber such that the second chamber has an open side, the first and second power boxes being coupled together such that the open sides of the first and second chambers open to one another to create a common chamber.

20. The power distribution unit of claim 13, wherein the first and second connector assemblies are both electrically connected to both the first and second power supply sources.

21. The power distribution unit of claim 13, further comprising a joining part separate and discrete from the first and second power boxes, the first power box being joined to the joining part and the second power box being joined to the joining part to gang the first and second power boxes to each other.

22. A power distribution kit for a manufactured wiring system, the power distribution kit comprising:
a primary unit comprising a main body having a base wall and opposed end walls integrally formed with, and extending perpendicularly from, the base wall, the primary unit includes two side walls and a cover wall; and
one or more supplementary units, each of the one or more supplementary units comprises a main body, a cover wall and a joining part, the main body of each of the one or more supplementary units having a base wall and opposed end walls integrally formed with, and extending perpendicularly from, the base wall, the main body of each of the one or more supplementary units being substantially identical to the main body of the primary unit;
wherein the primary unit and the one or more supplementary units cooperate to form a power distribution unit having at least two power boxes ganged together, the main body of the primary unit being joined to the main body of an adjacent one of the one or more supplementary units by a respective joining part, one of the side walls being coupled to the main body of the primary unit, the other side wall being coupled to the main body of one of the one or more supplementary units to form sides of the power distribution unit.

23. The power distribution kit of claim 22, wherein the side walls define a first side wall and a second side wall, when the one or more supplementary units comprises a first supplementary unit, the power distribution unit is assembled such that the joining part spans between, and is fastened to, the main body of the primary unit and the main body of the first supplementary unit, the first side wall being coupled to the main body of the primary unit opposite to the joining unit, the second side wall being coupled to the main body of the first supplementary unit opposite to the joining unit.

24. The power distribution kit of claim 23, wherein the cover wall of the primary unit is coupled to the main body of the primary unit and to the joining part, and the cover wall of the first supplemental unit is coupled to the main body of the first supplemental unit and to the joining part.

25. The power distribution kit of claim 23, wherein the joining part is separate and distinct from the main bodies of the primary unit and the one or more supplementary units, the joining part extending along a circumference of the main bodies and the cover walls of both the primary and supplementary units.

* * * * *